(12) United States Patent
Dunleavy et al.

(10) Patent No.: US 6,484,020 B1
(45) Date of Patent: Nov. 19, 2002

(54) PORTABLE COMMUNICATION DEVICE WITH A DEPLOYABLE EAR BUD

(75) Inventors: Thomas Dunleavy, Oxnard; Frank Nuovo, Los Angeles, both of CA (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/653,393

(22) Filed: Sep. 1, 2000

(51) Int. Cl.⁷ .................................................. H04B 1/08
(52) U.S. Cl. ..................... 455/350; 455/90; 455/575; 455/550
(58) Field of Search ................. 455/567, 575, 455/566, 557, 456, 90, 550, 569, 552, 350; 379/433.12, 433.13, 433.06, 420.02, 433.02

(56) References Cited

U.S. PATENT DOCUMENTS

| 5,260,998 | A | | 11/1993 | Takagi |
| 5,724,667 | A | * | 3/1998 | Furuno ........................ 455/575 |
| 5,883,966 | A | | 3/1999 | Kubo |
| 5,909,490 | A | * | 6/1999 | Sokolich ................. 379/433.02 |
| 6,266,516 | B1 | * | 7/2001 | Palkki .......................... 455/90 |
| 6,301,487 | B1 | * | 10/2001 | Nakamura .................. 455/550 |

FOREIGN PATENT DOCUMENTS

| DE | 199 07 572 A1 | 9/2000 |
| DE | 199 43 065 A1 | 3/2001 |
| EP | 0 580 334 A2 | 1/1994 |
| EP | 0 651 545 A1 | 5/1995 |
| WO | WO 00/11851 | 3/2000 |
| WO | WO 00/19625 | 4/2000 |

\* cited by examiner

Primary Examiner—Vivian Chin
Assistant Examiner—John J Lee
(74) Attorney, Agent, or Firm—Jubin Dana

(57) ABSTRACT

A communication device including control circuitry with transceiver capabilities, input keys coupled to the circuitry for entering information, a display coupled to the circuitry for visual presentation of information, a chassis for securely holding the circuitry and the display, a sound generation unit coupled to the circuitry for providing audio presentation of information, and a retaining unit secured to the chassis for releasable retaining the sound generation unit in the inactive position, wherein the retaining unit is operated by a button, such that pressing the key causes the retaining unit to release the sound generation unit thereby allowing the sound generation unit to move from an inactive position to an active position.

7 Claims, 7 Drawing Sheets

PORTABLE COMMUNICATION DEVICE WITH A DEPLOYABLE EAR BUD

BACKGROUND

This invention relates to portable communication devices, and more specifically to the mechanical features of a portable communication device with a deployable earpiece.

In general, portable communication devices have several common components, such as a transceiver unit controlled by circuitry, an input device coupled to the circuitry, a display unit coupled to the circuitry, and sound generation units working in conjunction with the transceiver unit. For example, known forms of generating sound in a portable communications device include the use of a speaker fixed in position, typically above the display unit. Each speaker unit requires a minimum volume of air for proper operation. Thus, the need to maintain a minimum volume of air in conjunction with the fact that the speaker is placed in a fixed position results in a minimum dimension for the device. Accordingly, manufactures of these devices are faced with the challenge of providing a compact and slim device while accommodating the air volume of the speaker unit.

Although the size of the speaker unit can be reduced, the problem faced by manufacturers is that reducing the size of the speaker unit results in poor sound quality and volume. Furthermore, due to the currently known and utilized geometric locations of the speaker unit on the device, if the device become too small or thin, then it is very difficult for the manufacturer to maintain the minimum volume needed for the speaker unit. Additionally, small speakers that result from the reduced air volume made it harder for the user to proximally align the speaker unit in an adequate manner with the user's ear.

Therefore, what is need is a speaker unit that is coupled to the circuitry of the device such that the volume of air needed by the speaker is not limited by the thickness of the device and the speaker unit can be adequately aligned in a sufficiently proximal location to the user's ear.

SUMMARY

A device is disclosed having a speaker system deployable and, thus, independent of the thickness of the device thereby allow the device to accommodate a larger speaker unit resulting in clearer sound production and obtaining adequate positioning of the device relative to the user's ear.

The device includes control circuitry for transceiver capabilities, a display coupled to the circuitry, an input unit for entering information, a chassis for securely holding the circuitry and the display, and a sound generating unit coupled to the circuitry for providing audio presentation of information, wherein the sound generation unit moves from an inactive position to an active position.

DETAILED DESCRIPTION

Figure 1:
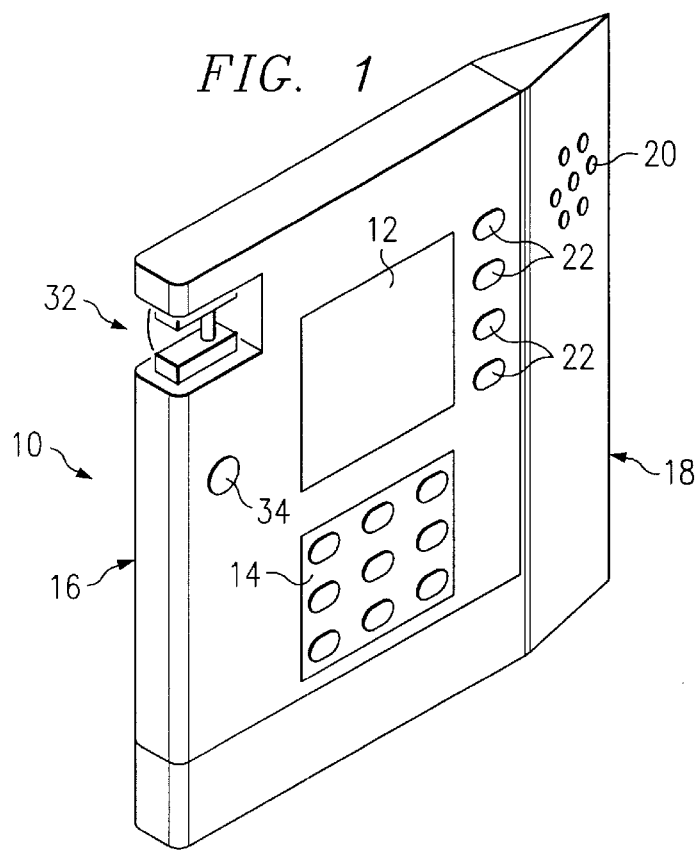
FIG. 1 is a perspective elevation of a device in accordance with the teachings of the present invention.
Figure 2:
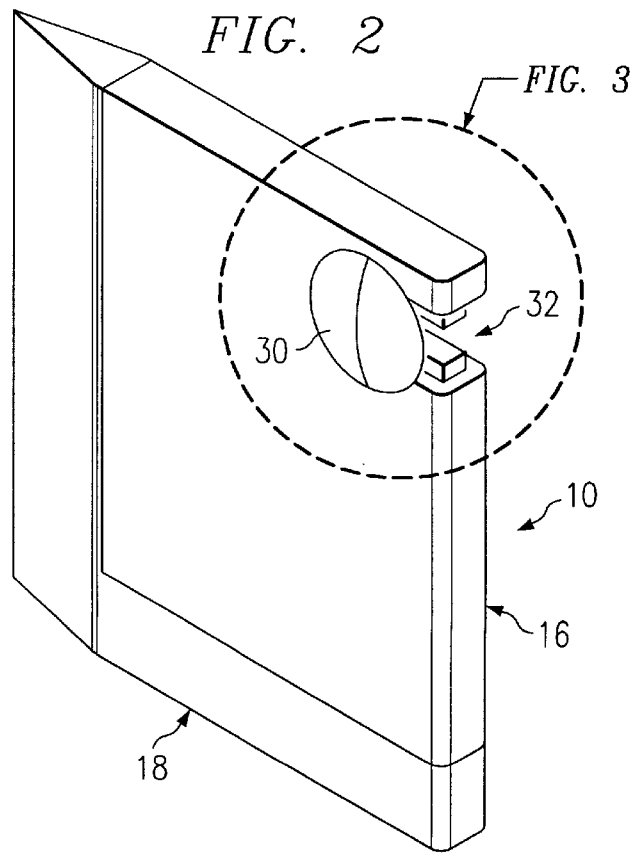
FIG. 2 is a perspective elevation of the opposite side of the device of FIG. 1 showing an ear bud.

Referring now to FIGS. 1 and 2, a portable communication device 10 includes a display unit 12 coupled to control circuitry and a keypad style input device 14 fixed to a chassis 16.

An elastomeric interface unit 18 is removably attached to the chassis 16. In addition to providing improved gripping features, the interface unit 18 is coupled to the control circuitry and provides a variety of interface features, such as a sound generating or speaker unit 20 for use when the device 10 is used in connection with various features provided. Additionally, it is contemplated that the interface unit 18 can include features such as special entertainment modules that interface with the control circuitry for enhance entertainment, such as gaming or DVD type interfaces. It will be apparent to those skilled in the art that a variety of hardware and software components can be incorporated into the interface unit 18 for interfacing with the control circuitry to provide enhanced services to the user.

Soft keys 22 are included in close proximity to the display 12. The soft keys 22 derive their function from the information displayed on the display 12. The information can be varied so that in one instant any particular soft key 22 can be pressed for one function and then at another instant that same soft key 22 can be pressed for an entirely different function as determined by the information displayed on the display 12.

Figure 4:
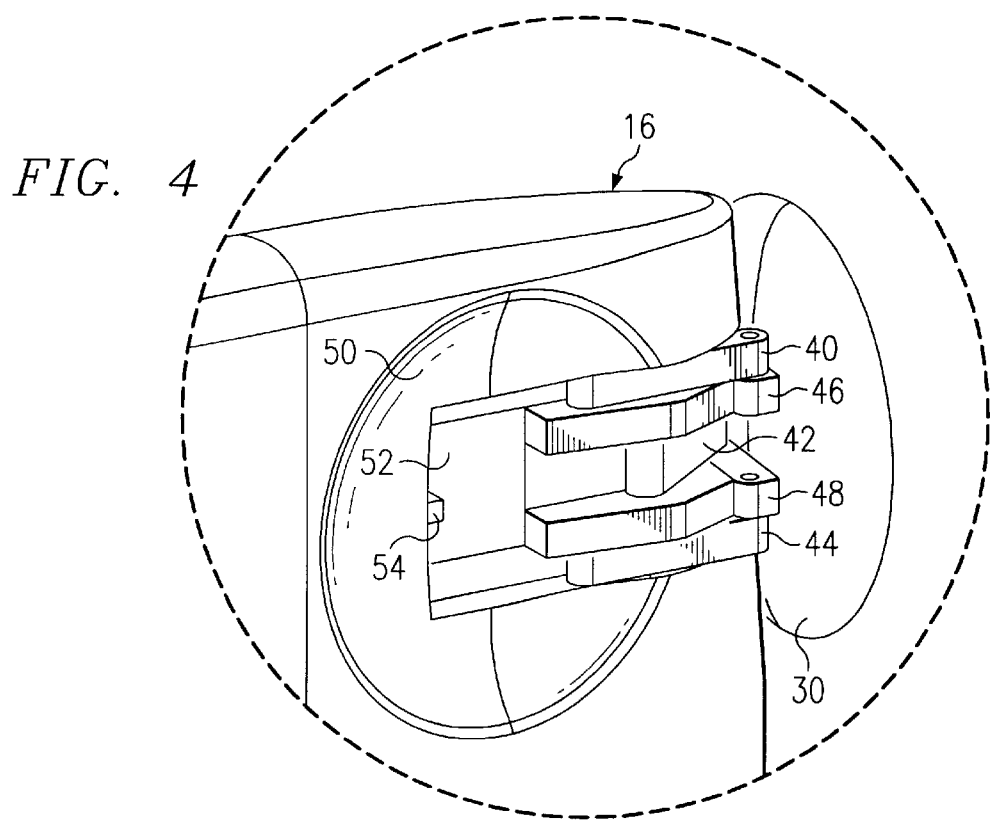
FIG. 4 is a more detailed perspective view of the device of FIG. 1 with the ear bud in the active or open position.

Referring specifically to FIG. 2, a deployable speaker unit or ear bud 30 is movably secured to the chassis 16 of the device 10. The ear bud 30 is shown in the parked position. The term "parked position" refers to or means that the ear bud 30 is in the closed position or the inactive position; this is the position in which the ear bud 30 is stored when not in use. The chassis 16 further defines an opening 32. The opening 32 allows the ear bud 30 to move from the parked position to the activated position, as shown in FIG. 4 and discussed in detail below. Thus, when the user of the device 10 receives and incoming call or desires to make an outgoing call, then the user has a choice of either using the speaker unit 20 or the ear bud 30. If the user chooses to use the ear bud 30 to carry out the call, then the user presses a release button 34 to cause the ear bud 30 to move from the parked position of FIG. 2 to a deployed or an active position of FIG. 4. The term "deployed" refers to or means that the ear bud 30 is in the open or active position; this is the position of the ear bud 30 when the ear bud 30 is being used to conduct a call.

Figure 3:
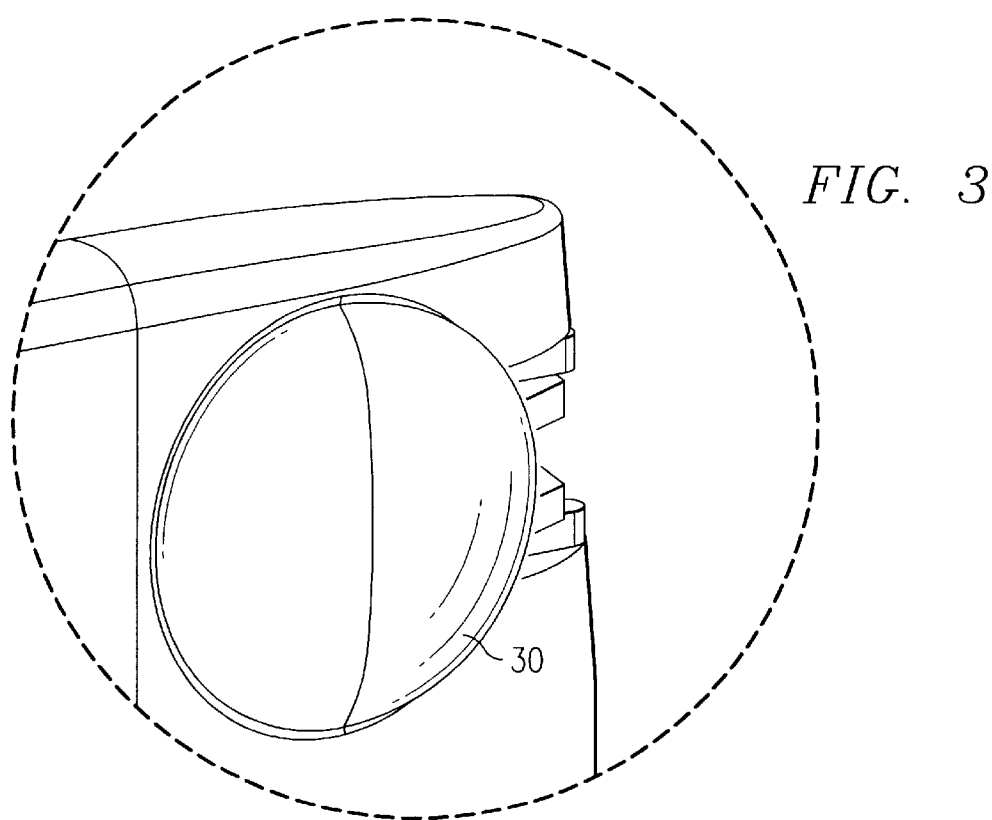
FIG. 3 is a more detailed perspective view of the device of FIG. 1 with the ear bud in the inactive or closed position.

Referring now to FIGS. 3 and 4, in an embodiment of the present invention, the ear bud 30 rotates or pivots about hinge arms 40, 42, and 44 and retainably pivots about guide arms 46 and 48. Although the terms "rotating" or "pivoting" is used in reference to the motion from the parked position to the deployed position, the invention is not limited thereby; the intent is to set forth and describe the concept of moving the ear bud 30 from a first position to a second position or as already mentioned to move from the parked position to the active position and back again irrespective of the label used or describe the motion. The chassis 16 defines an indentation 50 for matingly retaining the ear bud 30 in the parked position. The indentation 50 further defines a recess 52 for receiving the arms 40, 42, 44, 46, and 48. It will be apparent to those skilled in the art that the defined shape of the recess 52 can be varied. Furthermore, the defined shape of the recess 52 is defined by the geometry of the arms of the ear bud and not limited to the shape disclosed herein.

With the ear bud 30 in the parked position, the user will depress the button 34 to cause the ear bud 30 to move from the parked position to the deployed position. In one embodiment, the button 34 can be specifically designated for the deployment and the retraction of the of the ear bud 30. In an alternative embodiment the function of the button 34 can be incorporated into or as a part of the function of another button. For example, the function of the button 30 can be incorporated into the function of a typical "send" or "talk" key such that when the user presses the "send" or "talk" key the ear bud 30 is deployed from the parked position. It will be apparent, based on the teachings of the present invention, that the disclosure set forth herein is not limited by the key or the type of function of a key with which the function of the button 34 is combined.

For clarity the discussion herein will focus on the button 34 specifically designated to deploy the ear bud 30 from the parked position to the deployed position. Once the user presses the button 34, the ear bud 30 moves from the parked position to the deployed position. In one embodiment, the ear bud 30 moves from the parked position to the deployed position under spring tension. As the user moves the ear bud 30 from the deployed position to the parked position, the guide arms 46 and 48 cause a spring or tension rod to be compressed. Alternatively or additionally, the hinge arms 40, 42, and 44 can also be spring-loaded. Once the ear bud 30 is moved to the parked position a latch mechanism 54, which is coupled to and operated by the button 34, is engaged to retain the ear bud 30 in the parked position under tension. Thus, when the button 34 is pressed, the latch mechanism 54 is activated to release the ear bud 30 and the ear bud 30 is released such that the tension of the spring or rod forces the ear bud 30 to move from the parked position to the deployed position. In addition to spring loading the ear bud 30, a dampening unit can be included to control the speed at which the ear bud 30 moves from the parked position to the deployed position under tension.

Alternatively or additionally, a motor unit can be included to move the ear bud 30 from the parked position to the deployed position. The motor unit is activated when the user presses the button 34 thereby causing the ear bud to be released from the parked position and then moved, under the control of the motor unit, from the parked position to the deployed position. The motor unit can be coupled to guide arms 46 and 48. Alternatively or additionally, the motor unit may be coupled to the hinge arms 40 and 44.

Generally stated, when in the deployed position the tension of the spring or the gearing of the motor unit is used to prevent motion of the ear bud 30 back toward the parked position. However, various locking mechanisms can be used to securely lock the ear bud 30 in the deployed position and prevent motion toward the parked position until the locking mechanism for the deployed position is released. The locking mechanism for the deployed position can be coupled to the button 34. Alternatively, the locking mechanism for the deployed position can be coupled to the "end" key, such that when the user presses the "end" key the call session is terminated and the ear bud is released for return to the parked position; this can be set up to allow one press to terminate the call and release the locking mechanism for the deployed position or, alternatively, have a first press to terminate the call and a second consecutive presses to release the locking mechanism for the deployed position, which is similar to the double clicking feature of a mouse for a computer.

Figure 5:
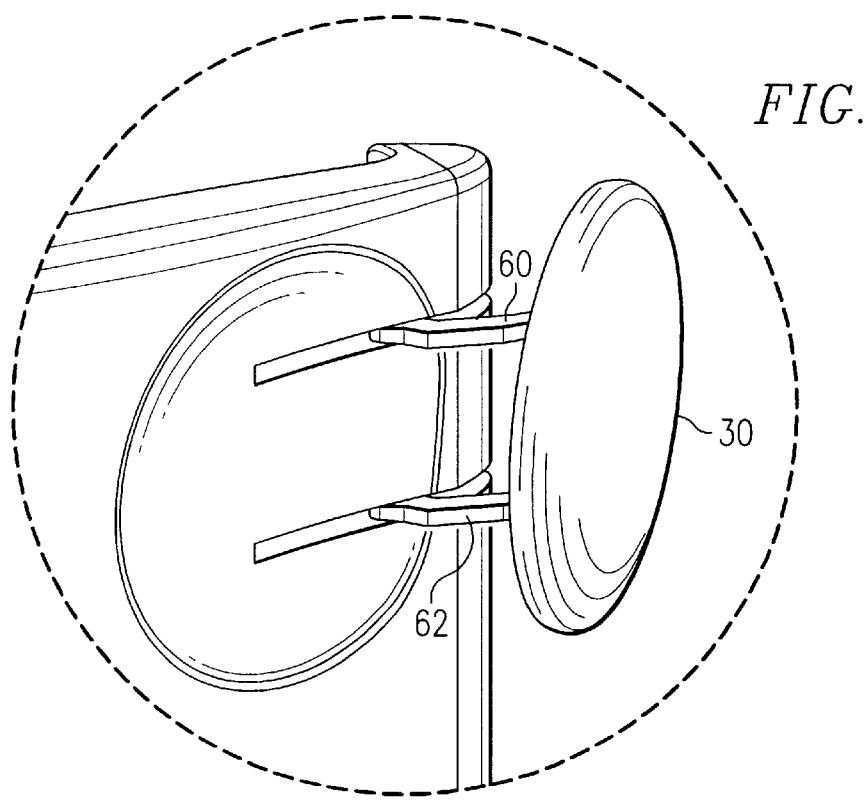
FIG. 5 is a detailed illustration of another embodiment of the mechanism used to move the ear bud of FIG. 1 from the parked position to the deployed position.
Figure 6:
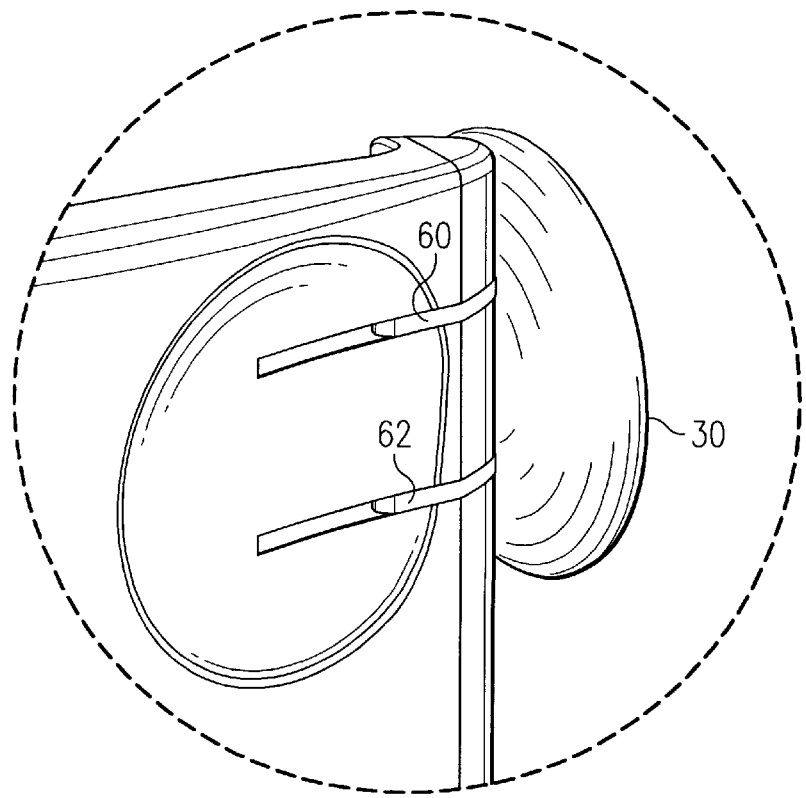
FIG. 6 is a detailed illustration of the embodiment of FIG. 5 with the ear bud in the deployed position.

Various other devices or mechanisms are contemplated for the motion of the ear bud 30 from the parked position to the deployed position. Referring now to FIGS. 5 and 6, arms 60 and 62 are used to allow the ear bud 30 to move from the parked position to the deployed position. As indicated above, some form of tension can be used to move the ear bud 30 from the parked position to the deployed position and/or a motor can be used. The action can be initiated using a button, such as the button 30 or the talk button that performs the deployment function as well initiating a voice communication session. Furthermore, in the deployed position, a locking mechanism can be used to retain the ear bud 30 in the deployed position.

Figure 7:
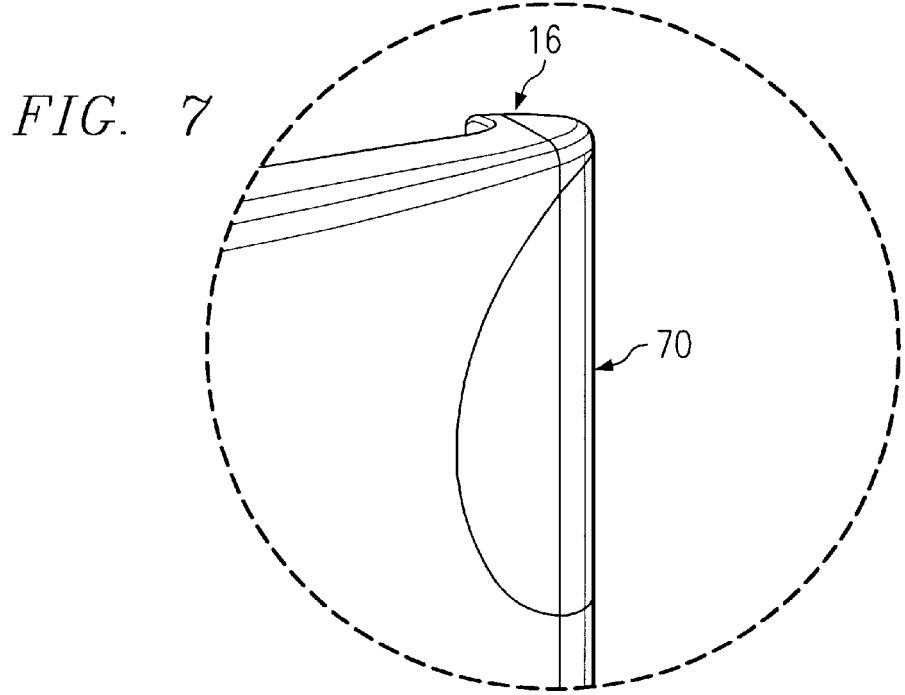
FIG. 7 is a detailed illustration of another embodiment of the ear bud in the parked position.
Figure 8:
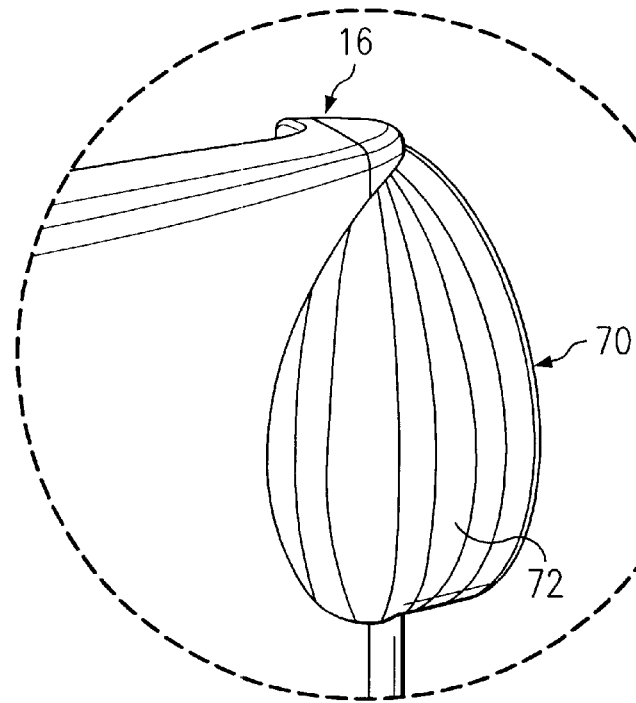
FIG. 8 is a detailed illustration of the embodiment of FIG. 7 with the ear bud in the deployed position.

Referring now to FIGS. 7 and 8, an ear bud 70 is shown in the parked position and the deployed positions, respectively. Half of the ear bud 70 is parked in on one side of the chassis 16 and the other half of the ear bud 70 is parked on the opposite side of the chassis 16. The ear bud 70 is released from the parked position by pressing a button, such as the button 34, under spring tension and/or motorized movement. In the deployed position, the ear bud 70 has a skirt or membrane portion 72 that fans out when the device is deployed. In the deployed position, the skirt portion 72 is fanned out and serves several functions, such as protection against foreign objects.

Figure 9:
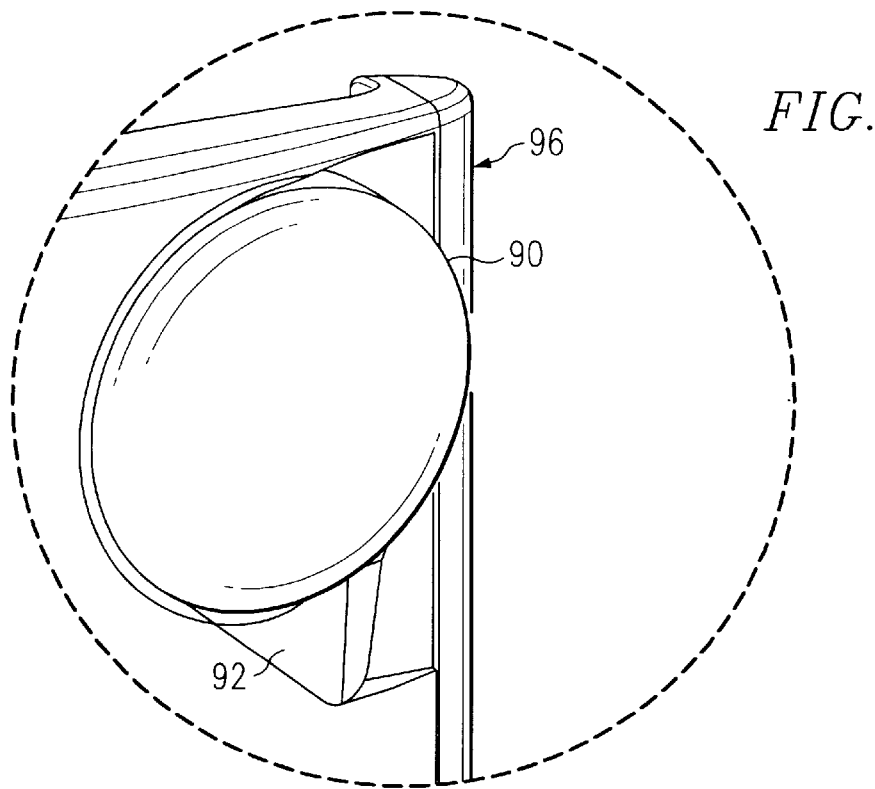
FIG. 9 is a detailed illustration of another embodiment of the ear bud in the parked position.
Figure 10:
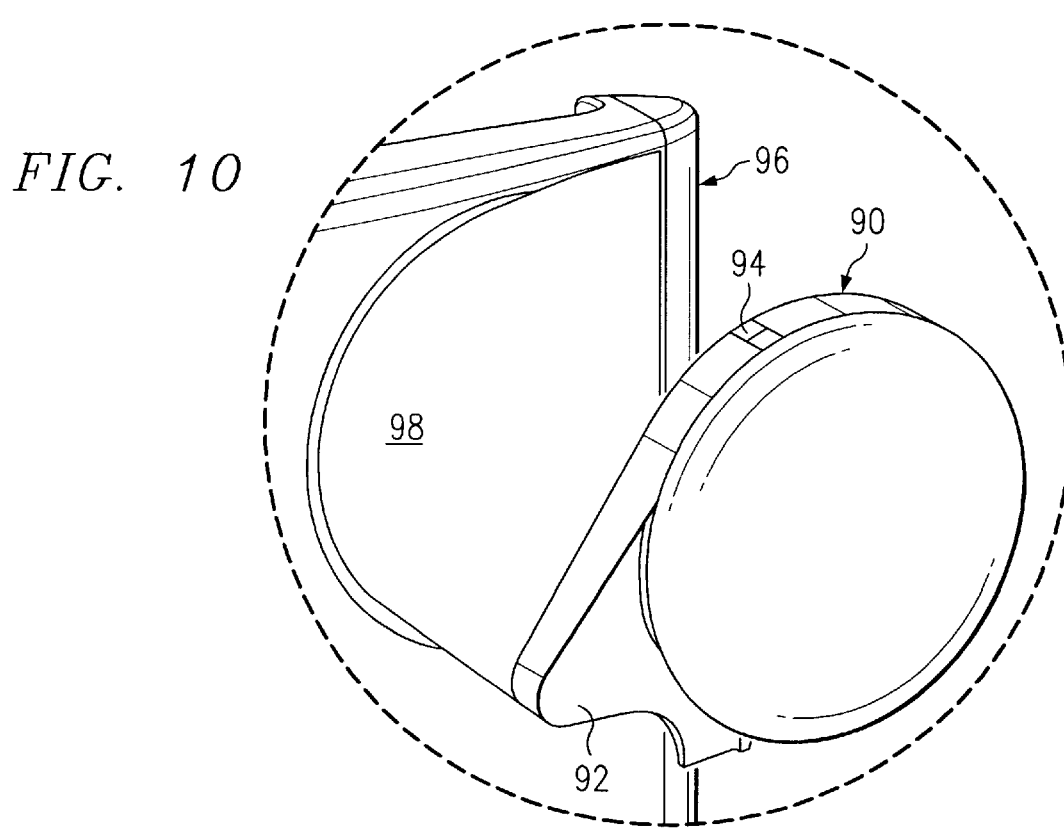
FIG. 10 is a detailed illustration of the embodiment of FIG. 9 with the ear bud in a partially deployed position.
Figure 11:
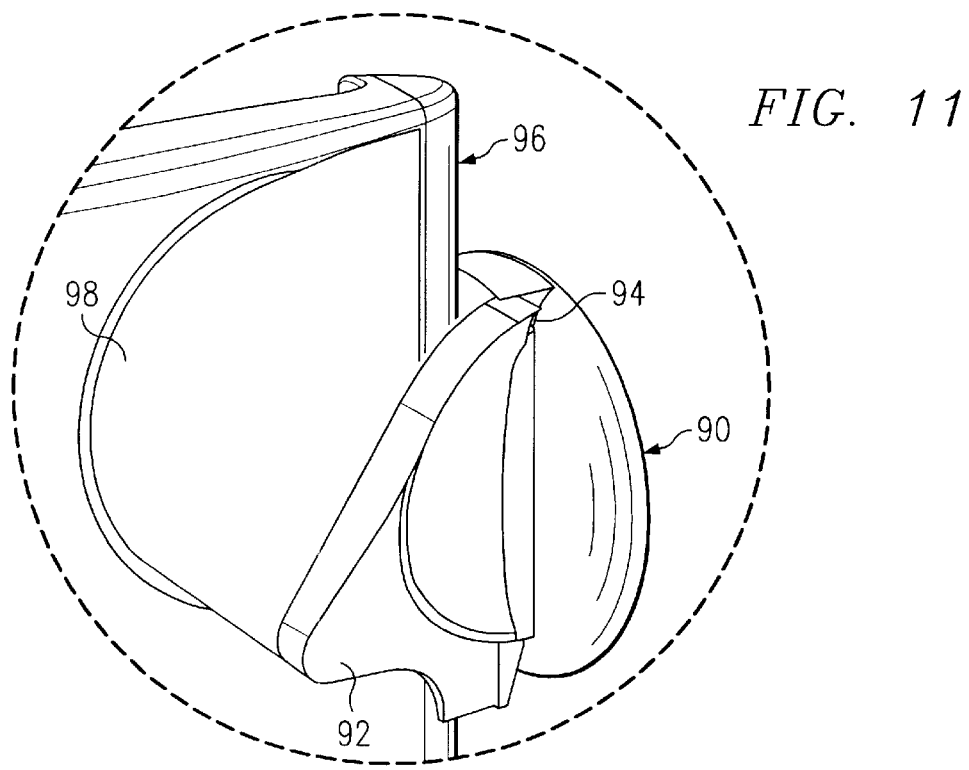
FIG. 11 is a detailed illustration of the embodiment of FIG. 9 with the ear bud in the deployed position.

Referring now to FIGS. 9, 10, and 11, an ear bud 90 is shown in the parked, partially deployed or partially parked, and the deployed positions, respectively. In the parked position, the chassis 96 defines a recess 98 wherein the ear bud 90 is matingly seated. The ear bud 90 rotates about an arm 92 from the parked position to the partially deployed position. Then from the partially deployed position the ear bud 90 pivots about a hinge 94 to the deployed position. As indicated above the motion of the ear bud 90 may be achieved using, independently or on conjunction, spring tension and/or a motorized drive unit.

Figure 12:
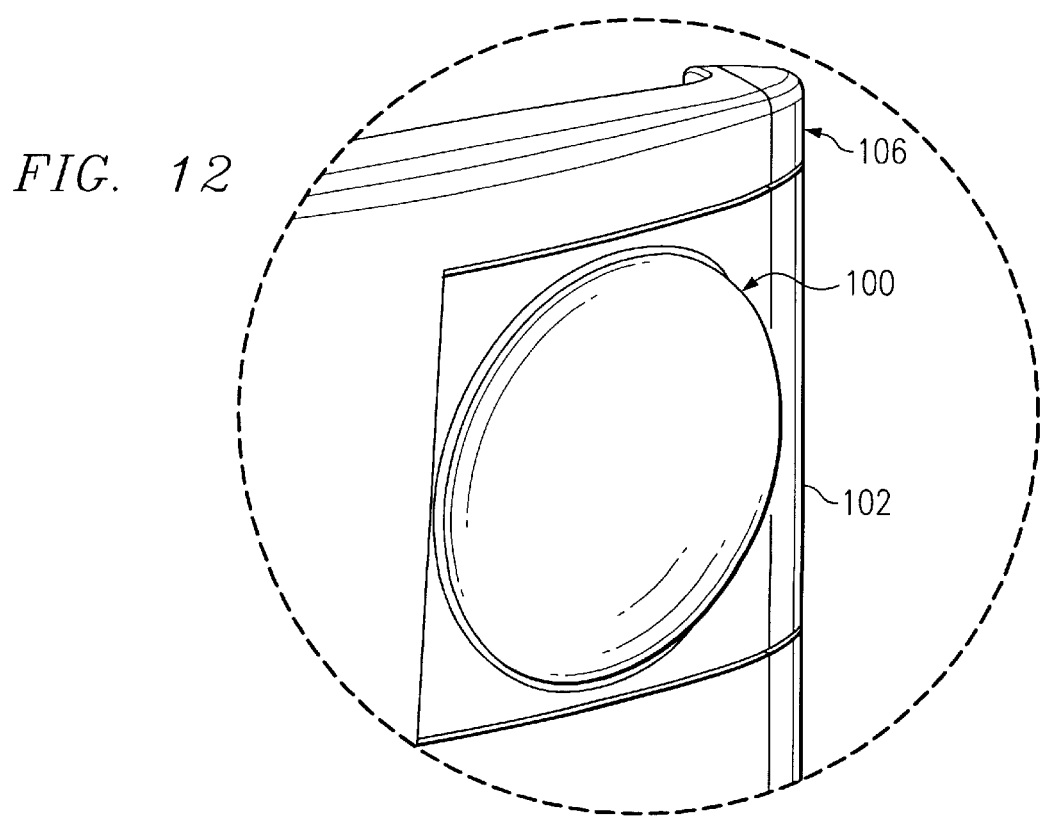
FIG. 12 is a detailed illustration of another embodiment of the ear bud in the parked position.
Figure 13:
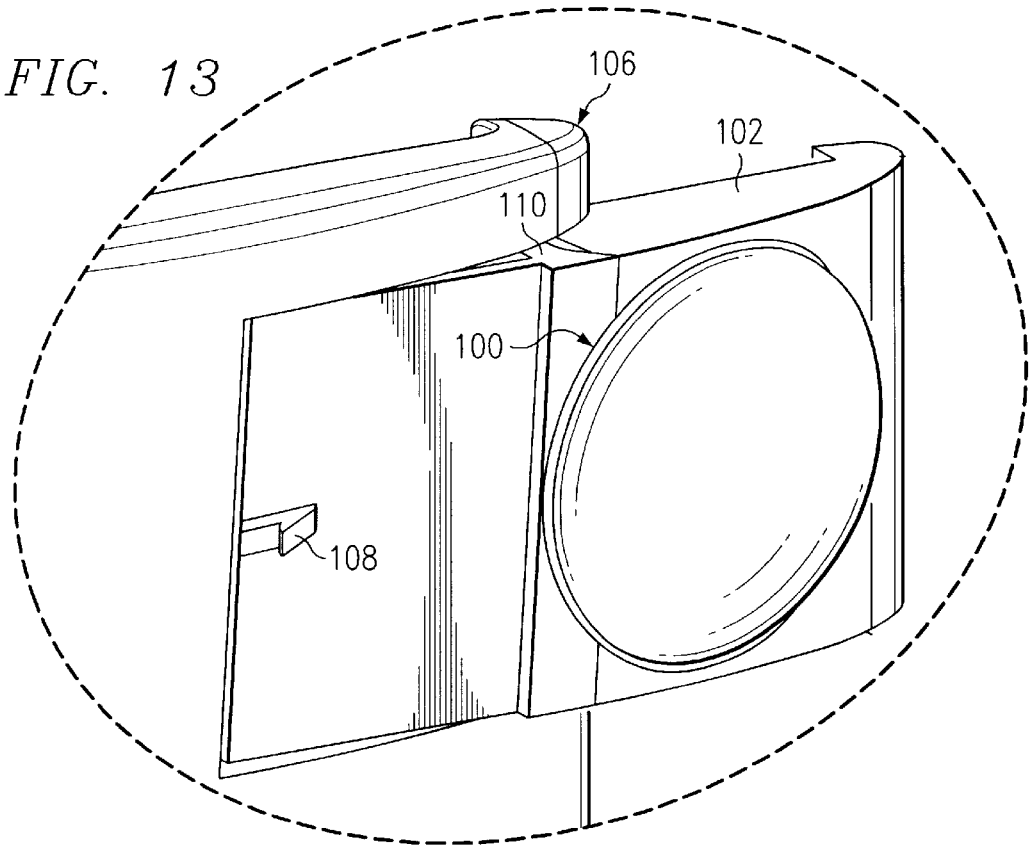
FIG. 13 is a detailed illustration of the embodiment of FIG. 12 with the ear bud in a partially deployed position.
Figure 14:
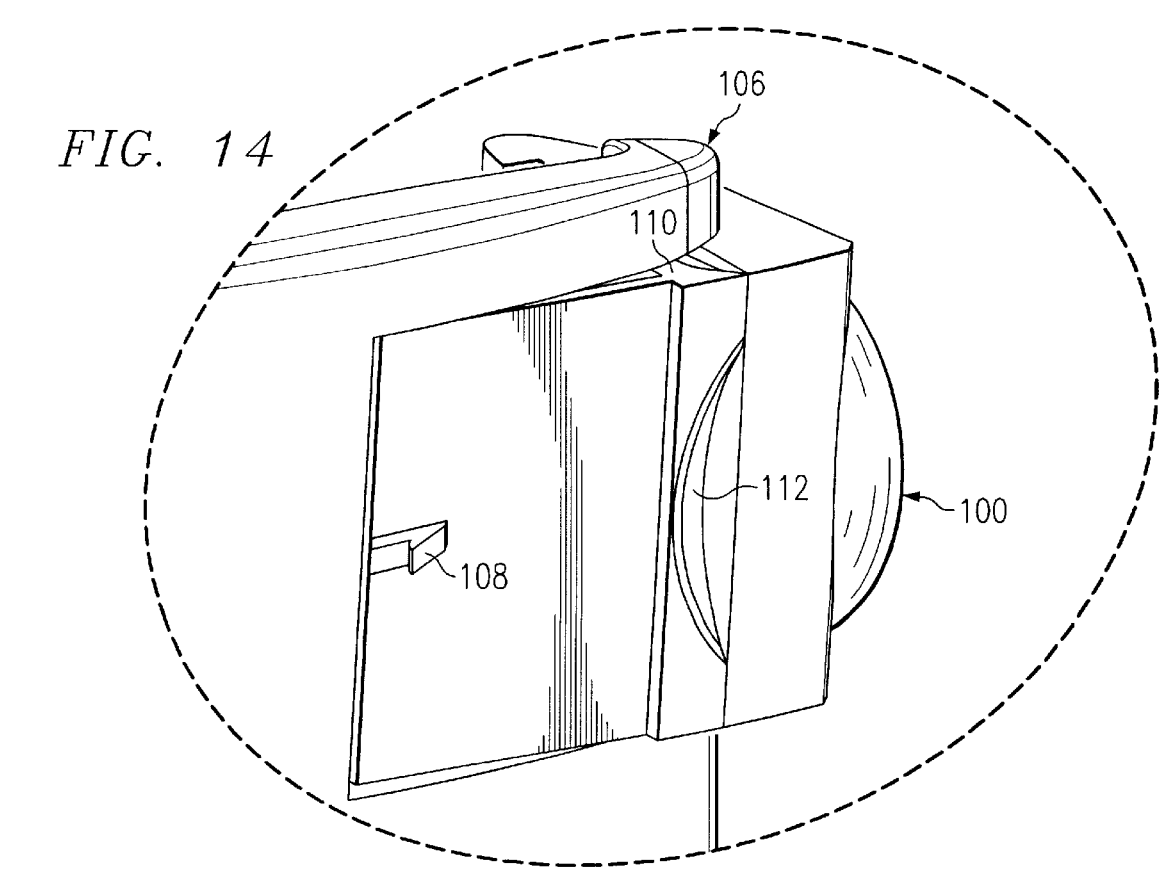
FIG. 14 is a detailed illustration of the embodiment of FIG. 12 with the ear bud in the deployed position.

Referring now to FIGS. 12, 13 and 14, and ear bud 100 is shown secured to a slide 102. Slide 102 moves along tracks located in a chassis 106. In the parked position the slide 102 is secured in place using a locking mechanism, such as the locking mechanism 108 with a matingly corresponding catch secured on the slide 102. The locking mechanism 108 can be controlled by a button, such as the button 34 of FIG. 1. The scope of the invention as set forth herein and the following claims is not limited by the type of locking mechanism utilized. With the device in the partially deployed position, the slide 102 pivots or rotates about a hinge arm 110 from the partially deployed or partially parked position to the deployed position. The arm 110 defines a recess 1 12 for matingly seating of the ear bud 100 while in the ear bud 100 is in the parked and the partially parked positions. Additionally, as indicated above, the ear bud 100 can be moved manually, under spring tension, or by a motorized unit.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A communication device including control circuitry with transceiver capabilities, input keys coupled to the circuitry for entering information, and a display coupled to the circuitry for visual presentation of information, the device comprising:

a chassis for securely holding the circuitry and the display;

a sound generation unit coupled to the circuitry for providing audio presentation of information, wherein the sound generation unit moves from an inactive position to an active position; and a retaining unit secured to the chassis for releasable retaining the sound generation unit in the inactive position, wherein the retaining unit is operated by a button such that pressing the button causes the retaining unit to disengage from and release the sound generation unit thereby allowing the sound generation unit to move from the inactive position to the active position, wherein the inactive position is in a first plane and the active position is in a second plane, such that the first and second planes intersect at a near perpendicular angle.

2. The communication device of claim 1, further comprising a locking mechanism coupled to the button for retaining the sound generation unit in the active position.

3. The communication device of claim 1 wherein the sound generation unit is rotatebly and pivotally deployed from the inactive position to the active position.

4. The communication device of claim 1, wherein the sound generation unit comprises a first portion and second portion pivotally secured to opposite sides of the chassis in the inactive position in near-parallel planes, such that when the button is pressed the first and second portions are deployed from the inactive position to the active position and the first and second portions are contain in approximately the same plane.

5. The communication device of claim 1, wherein the sound generation unit comprises:

a slide including a hinge movable retained in a first plane by the chassis; and a speaker unit secured to the slide, wherein the slide is partially deployed and then moves about the hinge to the active position in a second plane.

6. A portable communication device having control circuitry, the device comprising:

a chassis defining a recess;

a display secured to the chassis for visual presentation of information;

input keys secured to the chassis for entering information; and a sound generation unit, which is movably secured to the chassis in a matingly stored position in the recess of the chassis, for audio presentation of information, wherein the sound generation unit moves from the matingly stored position to a second position, wherein the matingly stored position is in a first plane and the second position is in a second plane, such that the first and second planes are near perpendicular.

7. The device of claim 1, wherein the audio unit is in an inactive mode while in the matingly stored position and in an active mode while in the second position.

\* \* \* \* \*